United States Patent Office 3,686,204
Patented Aug. 22, 1972

3,686,204
CYCLOALIPHATIC IMIDAZOLIDINE-2-ONE-1-CARBOXYLIC ACID AMIDES
Ferdinand Munz, Helmuth Hack, and Ludwig Eue, Cologne, Germany, assignors to Farbenfabriken Bayer Aktiengesellschaft, Leverkusen, Germany
No Drawing. Filed June 22, 1970, Ser. No. 48,473
Claims priority, application Germany, June 28, 1969, P 19 32 827.9
Int. Cl. C07d 49/30
U.S. Cl. 260—309.7    8 Claims

ABSTRACT OF THE DISCLOSURE

Cycloaliphatic imidazolidine - 2 - one - 1 - carboxylic acid amides of the formula

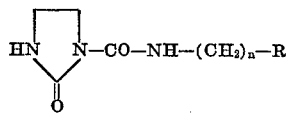

wherein R is an unsubstituted or substituted cycloaliphatic hydrocarbyl radical having 3 to 8 ring carbon atoms; and $n$ is 0 or 1; possess herbicidal, especially outstandingly selective herbicidal, activity.

---

The present invention relates to and has for its objects the provision for particular new cycloaliphatic imidazolidine - 2 - one - 1 - carboxylic acid amides which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that ureas, such as N-(3,4-dichlorophenyl)-N'-methyl-N'-butyl urea (cf. U.S. Pat. No. 2,655,444), or biurets, such as 1,3-diphenyl-5,5-dimethyl biuret (cf. German Pat. 1,032,595) can be used as herbicides.

The present invention provides cycloaliphatic imidazolidine - 2 - one - 1 - carboxylic acid amides of the general formula:

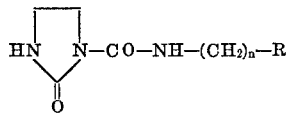

(I)

wherein R is an unsubstituted or substituted cycloaliphatic hydrocarbyl radical having 3 to 8 ring carbon atoms; and $n$ is 0 or 1.

The invention also provides a process for the production of cycloaliphatic imidazolidine - 2 - one - 1 - carboxylic acid amide of the general Formula I in which an imidazolidene-2-one-1-carbonyl chloride of the formula:

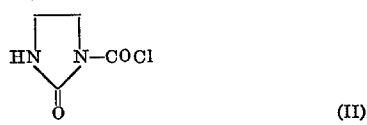

(II)

is reacted, in the presence of an acid-binding agent, with a primary amine of the general formula:

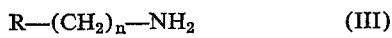

$$R—(CH_2)_n—NH_2 \quad (III)$$

It is very surprising that the active compounds according to the invention exhibit, in comparison with chemically similar compounds such as ureas and biurets, a substantially better selective herbicidal activity, with the same herbicidal potency.

The active compounds are clearly characterized by the above-mentioned Formula I. In this formula, R stands preferably for cycloalkyl with 5 to 8 ring members, i.e., ring carbon atoms (optionally substituted with alkyl having from 1 to 4 carbon atoms), such as cyclopentyl, cyclohexyl, methylcyclohexyl or cyclooctyl.

As examples of the amines which can be used according to the invention, there are mentioned: cyclopentylamine, cyclohexylamine, 2 - methylcyclohexylamine, 4-methylcyclohexylamine, cyclohexylmethylamine, cyclooctylamine.

The preparation of imidazolidine - 2 - one-1-carbonyl chloride can take place according to various methods. It is obtained in particularly simple manner from ethyleneurea and phosgene (cf. J. Org. Chem. 29 (1964), pp. 2401 to 2404).

The reaction according to the invention can be carried out in the presence of a solvent, this term includes a mere diluent, inert organic solvents such as aromatic hydrocarbons, for example benzene and toluene can be used. Surprisingly, water is still better as diluent, although carbonyl chloride, particularly N-carbonyl chlorides, are, in general, very sensitive to water. Thus, the comparable allophanic acid chloride $H_2N—CO—NH—COCl$, decomposes vigorously in water (cf. German Pat. No. 238,961).

As acid-binder, all customary acid-binding substances can be used. Preferred ones include alkali metal hydroxides and alkaline earth metal hydroxides, such as potassium hydroxide and calcium hydroxide, alkali metal carbonates and alkaline earth metal carbonates, such as sodium carbonate and calcium carbonate; tertiary amines, such as pyridine, as well as an excess of the amine used for the reaction. A solution of sodium hydroxide has proved particularly suitable.

The reaction temperature can be varied within a fairly wide range. In general, the work is carried out at 0° to 80° C., preferably 20° to 50° C.

In carrying out the process, 1 mole of imidazolidine-2-one-1-carbonyl chloride may be stirred with an amount of water sufficient to give a readily stirrable suspension. Then approximately 1 to 1.2 moles of amine and 1 mole of acid binding agent (preferably a solution of sodium hydroxide) may be run in simultaneously, with cooling, in such a manner that the amine is always present in excess. After the running in is complete, stirring may be continued until the mixture is cold. The precipitated reaction product may be filtered off with suction and washed with water. It is generally of good purity and, in general, does not require to be specially purified.

The active compounds exhibit a strong herbicidal potency and can therefore be used as weedkillers. By weeds in the widest sense are meant all plants which grow in cultivations or in other places where they are not desired. Whether the active compounds according to the invention act as total or selective herbicidal agents depends on the amount of active compound applied, as the artisan will appreciate.

The substances according to the invention can be used for example in the case of the following plants: dicotyledons, such as mustard (Sinapis), cress (Lepidium), cleaver (Galium), common chickweed (Stellaria), mayweed (Matricaria), smallflower (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds are preferably used as selective herbicides. They exhibit a particularly good selectivity when applied in the cultivation of beets, maize and cereals, particularly wheat.

The active compounds according to the instant invention can be utilized, if desired, in the form of the usual formulations or compositions with conventional inert (i.e., plant compatible or herbicidally inert) pesticidal diluents or extenders, i.e., diluents or extenders of the type usable in conventional pesticidal formulations or compositions, e.g., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g., conventional pesticidal surface-active agents, including empulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, ect.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, etheralcohols (e.g., glycol monomethyl ether, etc.), amines (e.g., ethanol-amine, etc.), amides (e.g., dimethyl formamide, etc.), sulfoxides (e.g., dimethyl sulfoxide, etc.), ketones (e.g., acetone, ect.), and/or water; as well as inert dispersible finely divided solid carriers such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose; emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite, waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

The active compounds may be applied before or after emergence of the plants, that is to say according to the pre- or post-emergence method.

The amount used may vary within fairly wide ranges. It depends essentially on the nature of the desired effect. In general, the amounts applied are from 0.5 to 15 kg. of active compound per hectare, preferably 1.0 to 10 kg./hectare.

The concentration of active compound in the usual types of preparation used for actual application is, in general, from 0.005 to 0.5 percent by weight, preferably 0.01 to 0.3 percent by weight.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–0.5%, preferably 0.01–0.3%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active amount of a carrier vehicle assistant, e.g., a surface-active agent, such as an emulsifying agent and/or a dispersing agent, and an amount of the active compound which is effective for the purpose in question and which is generally between about 0.005–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment in finely divided form, e.g., average particle diameter of from 50–100 microns or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from 20 to about 95% by weight of the active compound or even the 100% active substance alone, e.g., about 20–100% by weight of the active compound.

Furthermore, the present invention contemplates methods of selectively killing, combating or controlling undesired plants, e.g., weeds and the like, which comprise applying to at least one of (a) such weeds and (b) their habitat, i.e., the locus to be protected, a herbicidally effective or toxic amount of the particular active compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g., as total or only selective herbicidal effect and the plants which are to be controlled or protected. Therefore, in special cases, it is possible to go above or below the aforementioned concentration ranges.

The invention also provides crops protected from damage by weeds by being grown in areas in which, immediately prior to and/or during the time of the growing, a compound according to the invention was applied alone or in admixture with a solid or liquid diluent or carrier.

The invention is illustrated, without limitation, by the following examples.

EXAMPLE A

Pre-emergence test

Solvent: 5 parts by weight acetone
Emulsifier: 1 part by weight alkylaryl polyglycol ether To produce a suitable preparation of active compound, 1 part by weight of active compound is mixed with the stated amount of solvent, the stated amount of emulsifier is added and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0=no effect
1=slight damage or delay in growth
2=marked damage or inhibition of growth
3=heavy damage and only deficient development or only 50% emerged
4=plants partially destroyed after germination or only 25 emerged
5=plants completely dead or not emerged.

The active compounds, the amounts applied and the results obtained are set forth in Table 1.

EXAMPLE B

Post-emergence test

Solvent: 5 parts by weight acetone
Emulsifier: 1 part by weight alkylaryl polyglycol ether To produce a suitable preparation of active compound, 1 part by weight of active compound is mixed with the stated amount of solvent, the stated amount of emulsifier is added and the concentrate is then diluted with water to the desired concentration.

Test plants which have a height of about 5–15 cm. are sprayed with the preparation of the active compound until just dew moist. After three weeks, the degree of damage to the plants is determined and characterized by the values 0–5, which have the following meaning:

0=no effect
1=a few slightly burnt spots
2=marked damage to leaves
3=some leaves and parts of stalks partially dead
4=plant partially destroyed
5=plant completely dead.

The active compounds, their concentrations and the results obtained can be seen from Table 2.

TABLE 1.—PRE-EMERGENCE TEST

| Active compound | Active compound applied, kg./hectare | Beets | Wheat | Maize | Mustard | Galin-soga | Stel-laria | Lolium | Matri-caria |
|---|---|---|---|---|---|---|---|---|---|
| Cl-C6H3(Cl)-NH-CO-N(CH3)(CH2-CH2CH2-CH3) (known) | 5 | 5 | 4 | 3 | 5 | 5 | 5 | 5 | 5 |
| | 2.5 | 5 | 3 | 2 | 4 | 5 | 4 | 4.5 | 5 |
| C6H5-NH-CO-N(C6H5)-CO-N(CH3)2 (known) | 5 | 5 | 3 | 3 | 5 | 5 | 4.5 | 5 | 5 |
| | 2.5 | 3 | 2 | 2 | 4 | 5 | 4 | 4 | 4 |
| HN-N(CO)-C(O)-NH-C6H5 | 5 | 0.5 | 3 | 2 | 5 | 5 | 5 | 5 | 5 |
| | 2.5 | 0 | 1 | 0 | 5 | 5 | 4.5 | 5 | 5 |

TABLE 2.—POST-EMERGENCE TEST

| Active compound | Concentration of active compound in percent | Beets | Wheat | Mustard | Galin-soga | Mar-tri-caria | Stel-lari |
|---|---|---|---|---|---|---|---|
| Cl-C6H3(Cl)-NH-CO-N(CH3)(CH2-CH2-CH2-CH3) (known) | 0.1 | 4 | 2 | 4 | 4 | 1 | 4 |
| | 0.05 | 3 | 1 | 2 | 3 | 0 | 3 |
| C6H5-NH-CO-N(C6H5)-CO-N(CH3)2 (known) | 0.1 | 3 | 2 | 3 | 5 | 4 | 4 |
| | 0.05 | 1 | 1 | 2 | 4 | 3 | 3 |
| HN-N(CO)-C(O)-NH-C6H5 | 0.1 | 0 | 2 | 5 | 5 | 4.5 | 4.5 |
| | 0.05 | 0 | 0 | 4 | 4 | 3.5 | 3 |

EXAMPLE 1

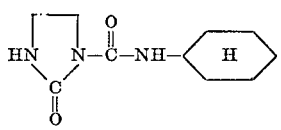

74.3 g. imidazolidine-2-one-1-carbonyl chloride were stirred with 100 ml. of water. To this there was added dropwise from a dropping funnel 49.5 g. cyclohexylamine, and from a second dropping funnel 50 ml. of solution of sodium hydroxide, with a content of 20 g. NaOH, in such a manner that the pH value ride not rise above 10. The temperature was kept to 20 to 25° C. by cooling. After dropwise addition of the total amine, the pH value was raised to 12 by the remainder of the solution of alkali. Stirring was effected afterwards for a short time, the precipitated product was filtered off with suction, and washing with water was effected. The yield of imidazolidine-2-one-1-carboxylic acid cyclohexylamide was 93.3 g. (88% of the theory). The melting point was 183 to 185° C.; after recrystallization from dimethyl formamide, it was 185° C.

In analogous manner, the compounds of the following table have been obtained ("R" and "$n$" are referring to the general Formula I (see column 1, lines 46 to 51):

TABLE

| Example No. | R | $n$ | Yield (percent) | M.P. (° C.) |
|---|---|---|---|---|
| 2 | Cyclopropyl | 0 | 47 | 176–177 |
| 3 | Cyclopentyl | 0 | 60 | 127–128 |
| 4 | Cyclohexyl | 1 | 68 | 120–121 |
| 5 | Cyclooctyl | 0 | 49 | 109 |

What is claimed is:

1. Cycloaliphatic imidazolidine-2-one-1-carboxylic acid amide compound of the general formula:

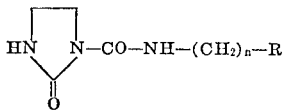

wherein R is cycloalkyl of 3 to 8 ring carbon atoms; or alkyl-substituted cycloalkyl of 3 to 8 ring carbon atoms wherein such alkyl contains from 1 to 4 carbon atoms; and $n$ is 0 or 1.

2. Compound according to claim 1 wherein R is cycloalkyl of from 3 to 8 ring carbon atoms.

3. Compound according to claim 2 wherein said cycloalkyl is substituted with at least one alkyl group of 1 to 4 carbon atoms.

4. Imidazoline-2-one-1-carboxylic acid cyclohexylamide as claimed in claim 2.

5. Imidazoline-2-one-1-carboxylic acid cyclopropylamide as claimed in claim 1.

6. Imidazoline-2-one-1-carboxylic acid cyclopentylamide as claimed in claim 1.

7. Imidazoline-2-one-1-carboxylic acid hexahydrobenzylamide as claimed in claim 1.

8. Imidazoline-2-one-1-carboxylic acid cyclooctylamide as claimed in claim 1.

References Cited

UNITED STATES PATENTS 3,232,933   2/1966   Gündel _____ 260—309.7

FOREIGN PATENTS 1,577,123   6/1969   France _____ 260—309.7

OTHER REFERENCES

Dunnigan et al.: Chem. Abst., vol. 49, column 6969 (1955).

Johnston et al.: J. Med. Chem., vol. 10, pp. 675–81 (1967).

Paranjpe: Chem. Abst., vol. 69, No. 96099n (1968).

Tilley et al.: J. Org. Chem., vol. 29, pp. 3347–50 (1964).

NATALIE TROUSOF, Primary Examiner

U.S. Cl. X.R.

71—92